W. K. THOMAS.
VARIABLE SPEED TRANSMISSION MECHANISMS FOR AUTOMOBILES.
APPLICATION FILED NOV. 6, 1915.
1,239,541.
Patented Sept. 11, 1917.
2 SHEETS—SHEET 1.
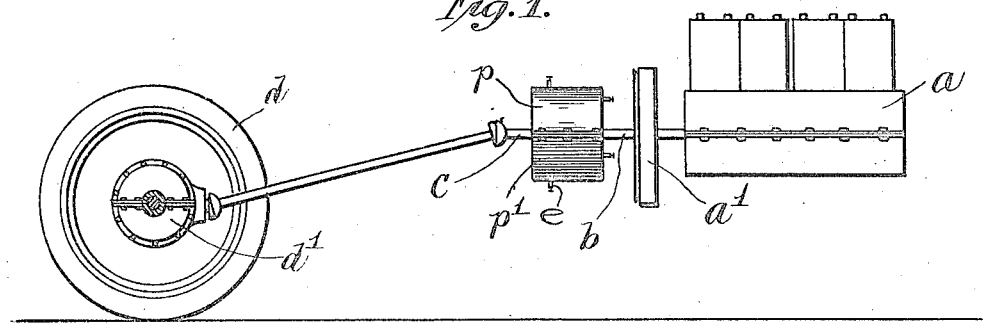
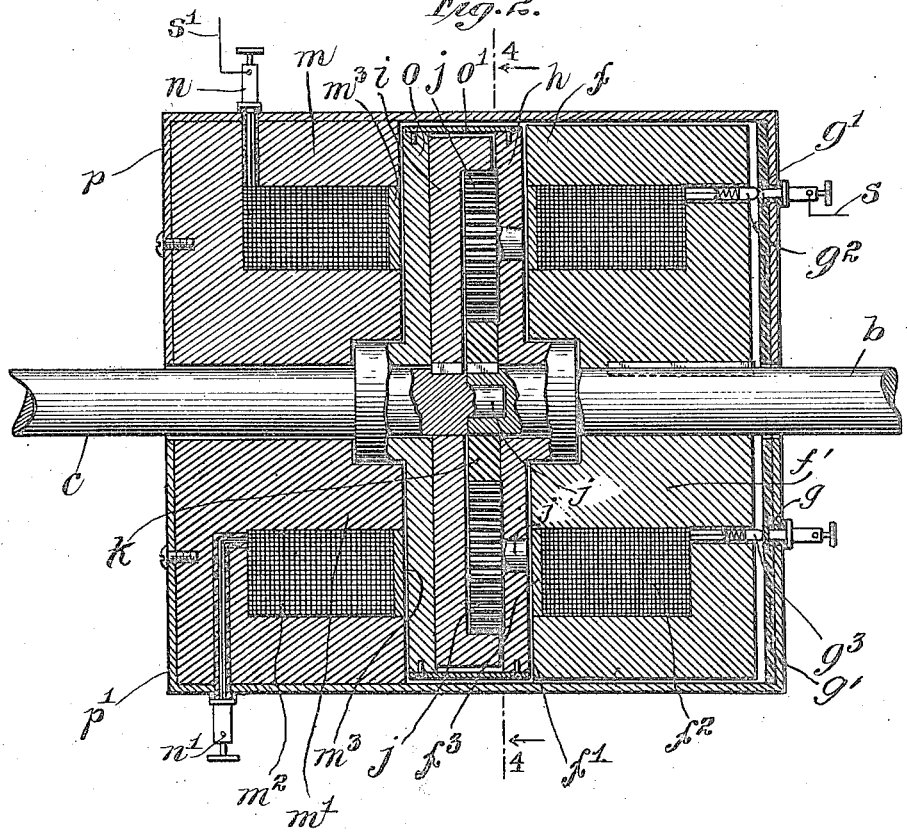
Attest:
Walter K Thomas Inventor:
by Frank T Wentworth
his Atty.

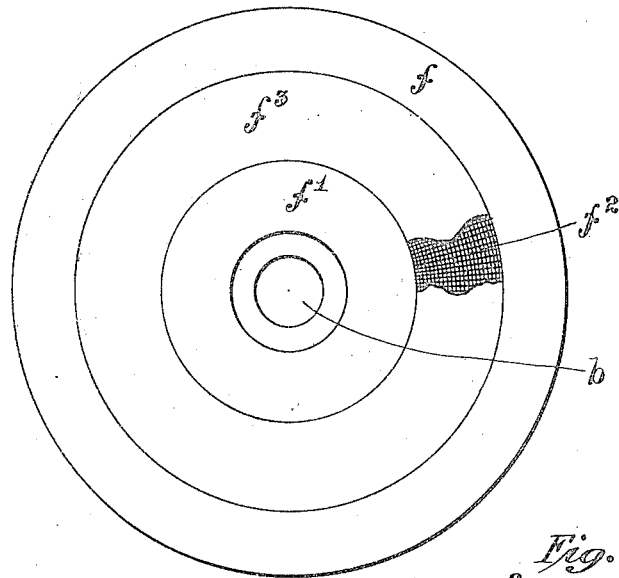
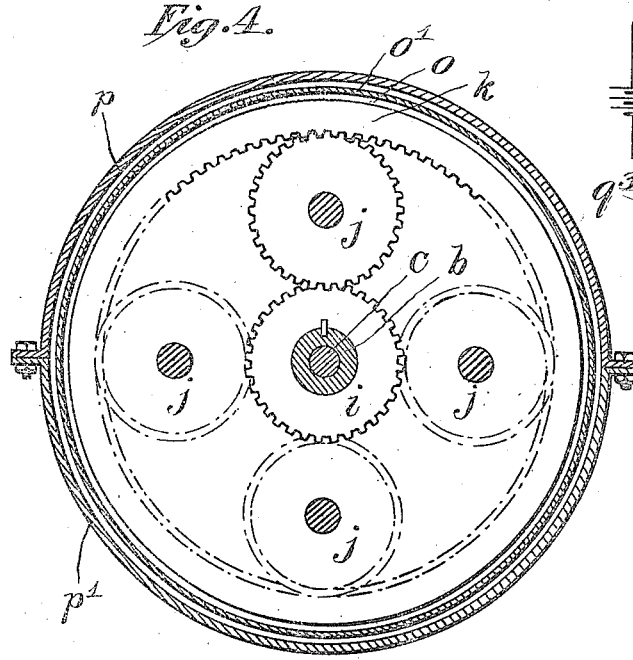
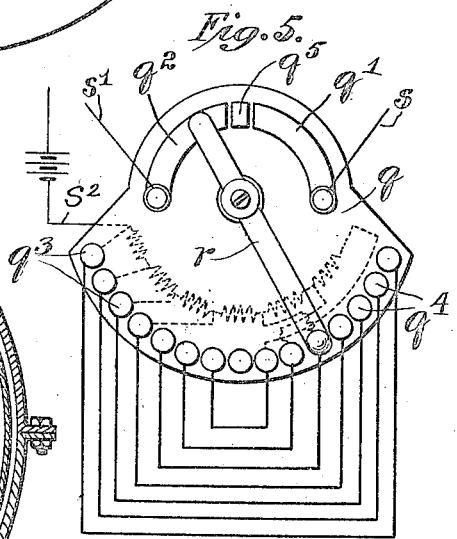

UNITED STATES PATENT OFFICE.

WALTER K. THOMAS, OF BROOKLYN, NEW YORK.

VARIABLE-SPEED TRANSMISSION MECHANISMS FOR AUTOMOBILES.

1,239,541.  Specification of Letters Patent.  Patented Sept. 11, 1917.

Application filed November 6, 1915. Serial No. 60,048.

*To all whom it may concern:*

Be it known that I, WALTER K. THOMAS, a citizen of the United States, residing at the borough of Brooklyn, in the city of New York, county of Kings, and State of New York, have invented certain new and useful Improvements in Variable-Speed Transmission Mechanisms for Automobiles, of which the following is a specification, reference being had therein to the accompanying drawings, which form a part thereof.

My invention relates to variable speed transmission mechanisms for automobiles, and more particularly to a mechanism of this type wherein the connection between the driving and the driven shaft sections is effected by means of electro-magnets.

In variable speed transmission mechanisms now in general use in those automobiles the motive power of which is derived from an internal combustion engine, variance in the speed of drive, or in the power applied to the driving wheels is secured by means of a system of gear wheels. By this construction, the speed of the driven shaft, connected with the differential gearing, always bears a certain definite ratio to the speed of the driving shaft, which ratio is predetermined by the relative diameters of the respective intermeshing gears in the transmission gear system. A change of the speed with this type of variable speed transmission system, is always a change from one definite speed to another definite speed, thus subjecting the engine, particularly when starting an automobile, to the maximum load for which the gears may be set. In this type of variable speed transmission, it is necessary to change while running, from one speed to another to disengage those gears which are in mesh, and engage other coöperating gears while the gears are in motion, there occurring instantly with this change of gears, a step in the power required of the engine, determined by the relative diameters of the respective gears. This type of gear transmission has little flexibility.

In a variable speed transmission system for an automobile made in accordance with my invention, I am enabled to use an internal combustion engine for developing the desired motive power and to change from one speed to another without transmitting the power through gears.

I am also enabled to gradually vary the torque exerted upon the driven shaft, by the driving shaft, in a manner to secure a gradual increase, or decrease, in the speed of an automobile while it is running, or to gradually increase the power transmitted to the driving wheels to the maximum engine power, in starting.

I am enabled to not only thus gradually vary the relative speeds of the driving, and the driven sections, of the transmission shaft but am enabled by means of my invention to reverse the direction of rotation of the driven shaft with that reduced speed desirable when reversing the direction of movement of an automobile. If desired the control for the transmission mechanism may be, and preferably is, so constructed as to permit a gradual application of the power to the reverse mechanism, thus increasing the flexibility of the transmission system and permitting an automobile to be brought from full speed ahead to full back speed, by a gradual reduction in the driving power for a straight ahead drive, and a gradual increase from a neutral point, to the point of a full back speed.

A transmission mechanism made in accordance with my invention possesses a degree of flexibility comparable with that of a steam engine, it being possible to increase, or reduce, the torque applied to the driven shaft so gradually as to avoid any possibility of a change from one predetermined speed to another predetermined speed, by a direct step.

While at all speeds ahead there is a direct drive from the driving shaft to the driven shaft section, the control for the variable speed mechanism is such as to permit that variance in the power applied to the driven shaft section above referred to. The coupling of the two shaft sections together, to secure this variable speed, is accomplished by means of an electro-magnet, the construction of the mechanism, however, being such as to permit an adequate lubrication without likelihood of short-circuiting the windings of the magnet. The various parts entering into the transmission mechanism are so constructed and combined as to reduce the wear upon the various parts to a minimum.

The invention consists primarily in a variable speed transmission mechanism for automobiles embodying therein a driving shaft, a driven shaft, an electro-magnet carried by and rotatable with said driving shaft, an armature rotatable in a fixed plane and positioned within the field of said magnet, operative connections between said armature and said driven shaft, whereby power may be transmitted from said driving shaft to said driven shaft, and means whereby the traction of said magnet may be varied and slippage between said magnet and said armature is permitted to reduce the speed of rotation of the driven shaft relatively to that of the driving shaft; and in such other novel features of construction and combination of parts as are hereinafter set forth and described and more particularly pointed out in the claims hereto appended.

Referring to the drawings:—

Figure 1 is a view of the running gear of an automobile embodying therein a variable speed transmission mechanism made in accordance with my invention;

Fig. 2 is a sectional view of the transmission mechanism;

Fig. 3 is a face view of the electro-magnet carried by the driving shaft;

Fig. 4 is a detail view of the mechanism for transmitting power from the driving shaft to the driven shaft; and Fig. 5 is a detail view of the rheostat switch for controlling the transmission mechanism.

Like letters refer to like parts throughout the several views.

In the embodiment of my invention shown in the drawings, $a$ indicates an internal combustion engine operatively connected by means of the clutch $a'$ with a driving shaft $b$, the driven shaft indicated at $c$ being connected in the usual manner to the driving wheels $d$ by means of the differential gear $d'$.

The driving shaft $b$ and the driven shaft $c$ are connected by means of a variable speed transmission mechanism $e$ so constructed as to permit variance in the speed of the driving wheels independently of the speed of the engine. This combination of parts considered broadly is old and well known, my invention relating more particularly to the construction of the variable speed transmission mechanism $e$.

Carried by and rotatable with the driving shaft $b$ is an electro-magnet having poles $f$—$f'$ and a winding $f^2$, the areas of said poles and the character of said winding being such as to permit the development of the desired maximum traction in the magnet. The said winding $f^2$ is seated in a chamber between the poles $f$ and $f'$, said chamber being closed by means of a plate $f^3$ of brass, or other non-magnetic material, so as to exclude oil from said winding. The current is delivered to the winding $f^2$ in any desired manner as by means of the contact rings $g$—$g'$ which are insulated from each other and the yieldable contacts $g^2$—$g^3$, electrically connected with the opposite terminals of said winding. The type of magnet herein shown and described is old and well-known in the electrical art, but any desired type of magnet may be substituted therefor without departing from the spirit and scope of my invention. The magnet described, however, lends itself readily to a transmission mechanism made in accordance with my invention.

Mounted closely adjacent the poles $f$—$f'$ is a disk armature $h$ rotatable in a fixed plane, operative connections being provided between said armature and the driven shaft, to permit the transmission of power from said driving shaft to said driven shaft. The connections above referred to comprises a gear $i$ carried by and rotatable with the driven shaft $c$, this gear in the form of the invention shown being an internal gear with an overhanging rim carrying the gear teeth. Coöperating with the gear $i$, are a plurality of pinions $j$ idly mounted upon arbors $j'$ carried by the armature $h$. These gears $j$ may be made of any desired material, or mounted in any desired manner, to prevent the attraction of the magnet upon the driving shaft interfering with the free rotation thereof. Carried by the driving shaft $b$, between the armature $h$ and the gear $i$, is a gear $k$, the pinions $j$ respectively, being constantly in mesh with the gears $i$ and $k$. By this construction the several gears $i$—$j$—$k$ act as a mechanical clutch for transmitting power from the driving shaft to the driven shaft in a straight ahead drive; permit a variance in the speed of said drive under control of the armature $h$, as determined by the variance in the traction of the magnet; and at the same time permit a reversal of the direction of rotation of the driven shaft under the control of a mechanism to be hereinafter described.

In the form of the invention shown, the armature $h$ is mounted upon the shaft $b$, the application of power to the driven shaft $c$, being at all times, through the gear $i$. When the electro-magnet carried by the shaft $b$ is energized, the armature $h$ will rotate therewith, and power will be transmitted by means of this armature to the gear $i$ and thus to the shaft $c$. With a reduction in the traction of the said magnet, the said armature may rotate at a speed lower than that of the magnet. Furthermore, when the mechanism is set for a reverse drive said armature may be held against rotation, so as to cause the driving power to be transmitted to the gear $i$ through the gears $k$ and $j$. Thus, by providing an armature adapted to be connected with the driven shaft through a rotatable mechanism intermediate it and the shaft, part of which mechanism is carried by the armature, part by the driving shaft, and part by the driven shaft, I am enabled to secure a variable speed of the driven shaft in one direction and a reversal of said driven shaft without the shifting of gears, there always being a direct drive ahead from the driving shaft to the driven shaft irrespective of variances in the speed of the drive.

To permit a reverse drive of the driven shaft, $c$, I provide means whereby the armature $h$ may be held against rotation with the driving shaft, thus causing the transmission of power to be solely through the gear train $i$—$j$—$k$, these gears under such conditions rotating freely instead of acting as a clutch as in a straight ahead drive. In the form of the invention shown, the means for holding the armature $h$ against rotation comprises a non-rotatable magnet preferably similar in construction to the electro-magnet carried by the driving shaft $b$. This magnet encircles the driven shaft $c$ but is not connected therewith in any way. The reversing magnet has the poles $m$—$m'$ and a winding $m^2$ seated in a chamber therein which chamber is closed by the ring $m^3$ of brass or other non-magnetic material. The terminals of the winding $m^2$ are shown at $n$—$n'$. Rigidly connected with the armature $h$ by means of the rim $o'$ is a disk armature $o$ mounted in close juxtaposition to the poles $m$—$m'$ of the reversing electro-magnet. The armature $o$ is rotatably mounted on the shaft $c$.

The rim $o$ serves to inclose the gear train so that the same may be run in oil.

The transmission mechanism heretofore described, is inclosed in a casing preferably made in two parts, $p$—$p'$, so as to permit convenient access to the said mechanism. The reversing magnet is rigidly connected with this casing. Said casing is preferably made closed so that the armatures $h$—$o$ may run in oil and avoid all possible friction between said armatures and the poles of the magnet.

Each of the armatures $h$—$o$ is provided with a hub projecting into a recess formed in the magnets respectively, said hubs being large enough to afford an ample bearing surface for each of said armatures.

The two shaft sections $b$ and $c$ are in direct alinement, a suitable thrust bearing being provided between these sections to preserve their alinement.

In connection with the transmission mechanism above referred to, I provide a rheostat switch $q$ having elongated contacts $q'$—$q^2$; oppositely disposed sets of point contacts $q^3$—$q^4$; and a neutral point $q^5$ intermediate the contacts $q'$—$q^2$. The switch lever is shown at $r$.

One of the switch terminals as $s$ in electrical connection with the contact $q'$ is in electrical connection with one terminal of the magnet winding $f^2$; another terminal as $s'$ in electrical connection with the contact $q^2$, is in electrical connection with one of the terminals of the magnet winding $m^2$, while the third terminal of said switch as $s^2$ in electrical connection through a variable resistance device with both sets of contacts $q^3$—$q^4$, leads to a source of power, as the generator or electric battery.

By means of this switch or other similar variable resistance controlling device, the current may be passed through either winding $f^2$ or $m^2$ and the traction of either electro-magnet may be varied according to the desired speed for the driven shaft. The switch lever $r$ in passing from one contact $q'$ to the other contact $q^2$ passes the neutral point $q^5$, opening both circuits. By this arrangement, the traction of either magnet may be gradually increased or reduced and when coming from a speed ahead to a reverse, or vice versa, it is necessary to first reduce the traction of one magnet, entirely cut off the current therefrom, and then gradually increase the traction of the other magnet, a condition lending great flexibility to the transmission mechanism. In a device made in accordance with my invention, a variable resistance switch or other similar resistance device for controlling the current flowing to the magnets is essential as without it, it is impossible to secure variable speeds in the transmission independently of the engine speed.

The operation of the herein described mechanism is substantially as follows:—

In describing the operation of the device, it will be assumed that the automobile is standing still; and the engine $a$ is running preparatory to starting the vehicle, the clutch $a'$ being set to connect the driving shaft $b$ with the engine, causing said shaft, and the electro-magnet carried thereby, to rotate at the speed of rotation of the engine. It may be here noted that this condition continues at all times so long as the engine is running and the clutch $a'$ is set, irrespective of the speed of the drive or of the direction thereof.

When starting the engine, the lever $r$ is set on the neutral contact $q^5$ so that the magnet upon the shaft $b$ is not energized.

While the engine is running light, the gear $k$ will rotate the armature $h$, through the gears $j$ running idly about the gear $i$, the speed of rotation of the armature being lower than that of the magnet upon the shaft $b$, as determined by the relative diameters of the gears $k$ and $i$.

To transmit power from the shaft $b$ to the shaft $c$, the lever $r$ is swung to the left, Fig. 5, to the first of the set of point contacts $q^3$, thus closing the circuit to the winding $f^2$, and including in this circuit the entire strength of the resistance device of the switch.

This closing of the circuit to the winding $f^2$ will develop the minimum traction of the said magnet which will tend to increase the speed of rotation of the armature $h$ causing a limited clutch action by the gears $k$—$j$—$i$.

While the armature $h$ is thus rotated in part by the said magnet and in part by the gear $k$ through the gears $j$ and gear $i$, the speed of rotation of said armature will be lower than that of the shaft $b$ and its magnet, the difference in speed being compensated for by magnetic slippage between said magnet and said armature.

If, however, the inertia of the vehicle, or the load upon the driven shaft $c$, be sufficiently great to prevent the turning of the gear $i$ by the clutch action above referred to, the resistance due to this action will react upon the armature $h$ and cause additional slippage of the magnet, no power being transmitted to the shaft $c$. By a continued movement of the lever $r$, however, the resistance in the controller switch $q$ will be gradually cut out as the lever moves from point to point of the set of contacts $q^3$, thus gradually increasing the traction of the magnet on the shaft $b$ until it is sufficiently great to take up the load upon the gear $i$. Thereupon the magnet upon the shaft $b$ will impart rotary movement to the armature $h$ in excess of its movement under the control of the gear $k$, with a resultant rotation of the gear $i$ and the shaft $c$ to which it is attached. The speed of rotation of the shaft $c$ will be equal to the excess rotary movement of the armature $h$ above referred to, the torque upon the shaft $c$ being substantially equal to the traction of the magnet. So long as the speed of rotation of the armature $h$ is lower than that of the magnet upon the shaft $b$ there will be magnetic slippage between said magnet and said armature, without, however, materially reducing the torque exerted by said magnet upon the shaft $c$.

Hence, as the traction of the magnet increases to a point to exert sufficient torque upon the shaft $c$ to take up the load thereupon, the vehicle will start at a low speed which speed will be gradually increased as the inertia of the vehicle is overcome, until the armature $h$ has attained its maximum speed with a given magnet traction for which the switch $q$ may be set.

It will be observed that, the starting point of the vehicle is determined by the traction or pull of the magnet, and that this may be gradually increased with much the same effect as the power of a steam engine might be increased, for the same purpose, and that as with a steam engine, the starting speed will be low, but will increase under the same power, as the vehicle gathers momentum.

The slippage above referred to represents the difference between the power applied to the driving shaft and the maximum engine power, and this slippage will continue while the shaft $b$ is rotating until the traction of the magnet is substantially equal to the engine power, whereupon the shafts $b$ and $c$ will rotate in unison. When the armature $h$ and the gear $k$ are rotating at the same speed, the gears $i$—$j$—$k$ will form an absolute mechanical clutch and secure a direct coupling of the two shaft sections in the manner above referred to. When slippage occurs between the magnet upon the shaft $b$ and the armature $h$, however, the gears $j$ will be turned at a low speed by the gear $k$ running slowly about the gear $i$ and acting as a clutch to slowly rotate the shaft $c$ through their planetary movement with relation to the gears $i$—$k$.

If the switch $q$ be set at neutral, so as to deënergize the magnet upon the shaft $b$, the armature $h$ will be driven idly from the gear $k$ if the vehicle be stopped; but if the vehicle be in motion, the gear $i$ will also rotate, thus reducing the speed of rotation of the armature $h$. If the vehicle be running under acquired momentum, it will, therefore, be apparent that the magnet upon the shaft $b$ may be used to bring the driven shaft $c$ under the control of the engine, since the gear $i$ and the armature $h$ are interdependent one upon the other.

If it be desired to reverse the direction of rotation of the shaft $c$, the lever arm $r$ is brought from point to point of the contact set $q^3$ to neutral, thus gradually reducing the traction of the magnet upon the shaft $b$, to a point where this magnet is deënergized thus allowing the shaft $c$ and the armature $h$ to run freely. By swinging the lever $r$ to the right, Fig. 5, the circuit to the winding $m^2$ of the fixed magnet is closed, the traction of said magnet increasing as the resistance in the circuit is reduced by a continued movement of said lever from point to point of the said contacts $q^4$. As the said magnet is initially energized it will act upon the armature $o$ as a drag to reduce the speed of rotation of the armature $h$ carrying the gears $j$, thus causing the application of a stress upon the gear $i$ in a direction opposite to that of its rotation. As the traction of the magnet is increased by means of the switch $q$, the armature $o$ and with it the armature $h$ will be gradually brought to a full stop causing the gear $k$ through the intermediate idler gears $j$ to impart a reverse rotation to the gear $i$ and the shaft $c$. By quickly cutting out all of the resistance in the line to the winding $m^2$ the transmission mechanism may be practically instantly reversed. When the lever is moved more slowly, however, the stoppage of the vehicle and its reversal will be gradual.

Before the fixed magnet has attained its maximum traction, however, there will be magnetic slippage between the poles $m$—$m'$ of said magnet and the armature $o$, thus permitting the gradual stoppage and reversal of the rotation of the shaft $c$ in the manner above referred to.

Friction upon the coöperating moving parts may be reduced to a minimum by introducing oil within the casing $p$—$p'$ and within the space between the armatures $h$—$o$. The closure plates $f^3$—$m^3$ exclude this oil from the magnet windings and the poles $f$—$f'$ and $m$—$m'$ are spaced slightly away from the armatures $h$—$o$ respectively so as to avoid friction, without however, interfering with the pull of either magnet upon its armature.

The armatures $h$—$o$ both rotate in a fixed plane, substantial movement of neither of these armatures toward or from its magnet being necessary to actuate the transmission mechanism.

While I have described my invention in connection with an automobile, it is apparent that it may be effectively used in marine work or in any other connection where a variable speed in one direction and a reverse is required.

It is not my intention to limit the invention to the details of construction herein shown and described, it being apparent that such may be varied to adapt the mechanism to different conditions of use, without departing from the spirit and scope of the invention.

Having described the invention what I claim as new and desire to have protected by Letters Patent is:—

1. A variable speed transmission mechanism for automobiles embodying therein a driving shaft, a driven shaft, a planetary gear system adapted to act as a clutch for transmitting power from said driving shaft to said driven shaft, an armature idly mounted in relation to said shafts, an electro-magnet carried by and rotatable with said driving shaft, one of the gears of said planetary system being carried by and rotatable with said driving shaft, other gears of said system being carried by and rotatable with said armature, and the remainder of the gears of said system being carried by and rotatable with said driven shaft whereby when said magnet is energized said clutch will be set and when said magnet is deënergized said gearing will be permitted to run idly and means whereby the operative effect of said gear train may be varied to secure variable speed in the driven shaft with a constant speed of the driving shaft.

2. A variable speed transmission mechanism for automobiles embodying therein a driving shaft, a driven shaft, a planetary gear system adapted to act as a clutch for transmitting power from said driving shaft to said driven shaft, an armature idly mounted in relation to said shafts, an electro-magnet carried by and rotatable with said driving shaft, one of the gears of said planetary system being carried by and rotatable with said driving shaft, other gears of said system being carried by and rotatable with said armature, and the remainder of the gears of said system being carried by and rotatable with said driven shaft whereby when said magnet is energized said clutch will be set and when said magnet is deënergized said gearing will be permitted to run idly, and a variable resistance switch whereby the traction of said magnet may be varied to modify the operative effect of said clutch mechanism.

3. A variable speed transmission mechanism for automobiles embodying therein a driving shaft, a gear carried thereby and rotatable therewith, a driven shaft, a gear carried thereby and rotatable therewith, idler gears in mesh with the gears upon said driving shaft and said driven shaft respectively and means controlling the operative effect of said gears comprising an armature, means whereby said idler gears are mounted thereon, an electro-magnet carried by and rotatable with said driving shaft in close proximity to said armature, and means whereby the traction of said electro-magnet may be varied whereby the speed of said driven shaft may be varied while that of the driving shaft remains constant.

4. A variable speed transmission mechanism for automobiles embodying therein a driving shaft, a gear carried thereby and rotatable therewith, a driven shaft, a gear carried thereby and rotatable therewith, idler gears in mesh with the gears upon said driving shaft and said driven shaft respectively and means controlling the operative effect of said gears comprising an armature, means whereby said idler gears are mounted thereon, an electro-magnet carried by and rotatable with said driving shaft in close proximity to said armature, and a variable resistance switch whereby the traction of said magnet may be varied to modify the operative effect of said clutch mechanism.

5. A variable speed transmission mechanism for automobiles embodying therein a driving shaft, a driven shaft, an electro-magnet carried by and rotatable with said driving shaft, an armature rotatable in a fixed plane and positioned within the field of said magnet, operative connections between said armature and said driven shaft, whereby power may be transmitted from said driving shaft to said driven shaft, means whereby the operative effect of said last named connections may be reversed to impart a reverse rotation to said driven shaft, and means whereby the traction of said magnet may be varied and slippage between said magnet and said armature is permitted to reduce the speed of rotation of the driven shaft relatively to that of the driving shaft.

6. A variable speed transmission mechanism for automobiles embodying therein a driving shaft, a driven shaft, a rotatable magnet adapted to be constantly rotated by said driving shaft, a rotatable armature adjacent said magnet, means carried by said driving shaft whereby said armature may be constantly rotated in the same direction as, but at a lower speed than, said magnet, means carried by said driven shaft, whereby power may be applied thereto by said armature, means whereby the operative effect of said last named means may be reversed to impart a reverse rotation to said driven shaft, and an electrical switch in the circuit to said magnet.

7. A variable speed transmission mechanism for automobiles embodying therein a driving shaft, a driven shaft, a rotatable magnet adapted to be constantly rotated by said driving shaft, a rotatable armature idly mounted adjacent said magnet, a gear carried by said driving shaft, a gear carried by said driven shaft, idler gears rotatably mounted upon said armature and in mesh with said other gears whereby said armature may be constantly rotated in the same direction as, but at the same or a lower speed than said magnet, and power may be transmitted from said driving shaft through said armature and means whereby the traction of said electro-magnet may be varied whereby the speed of said driven shaft may be varied while that of the driving shaft remains constant.

8. A variable speed transmission mechanism for automobiles embodying therein a driving shaft, a driven shaft, a rotatable magnet adapted to be constantly rotated by said driving shaft, a rotatable armature idly mounted adjacent said magnet, a gear carried by said driving shaft, a gear carried by said driven shaft, idler gears rotatably mounted upon said armature and in mesh with said other gears whereby said armature may be constantly rotated in the same direction as, but at the same or a lower speed than, said magnet, and power may be transmitted from said driving shaft through said armature and said gears to said driven shaft, and a variable resistance switch whereby the traction of said magnet may be varied.

9. A variable speed transmission mechanism for automobiles embodying therein a driving shaft, a driven shaft, a rotatable magnet adapted to be constantly rotated by said driving shaft, a rotatable armature adjacent said magnet, a gear carried by said driving shaft, a gear carried by said driven shaft, idler gears rotatably mounted upon said armature and in mesh with said other gears whereby said armature may be constantly rotated in the same direction as, but at a lower speed than said magnet, and power may be transmitted from said magnet through said armature and said gears to said driven shaft, a non-rotatable magnet also operative upon said armature whereby rotary movement thereof is prevented and power is transmitted through said gears as a train to reverse the direction of rotation of the driven shaft, and an electrical switch whereby the circuit may be closed to either of said magnets.

10. A variable speed transmission mechanism for automobiles embodying therein a driving shaft, a driven shaft, a rotatable magnet adapted to be constantly rotated by said driving shaft, a rotatable armature adjacent said magnet, a gear carried by said driving shaft, a gear carried by said driven shaft, idler gears rotatably mounted upon said armature and in mesh with said other gears whereby said armature may be constantly rotated in the same direction as, but at a lower speed than said magnet, and power may be transmitted from said magnet through said armature and said gears to said driven shaft, a non-rotatable magnet also operative upon said armature whereby rotary movement thereof is prevented and power is transmitted through said gears as a train to reverse the direction of rotation of the driven shaft, and a variable resistance switch whereby the circuit to either of said magnets may be closed and the traction thereof may be varied, the resistance in said switch being so arranged as to gradually reduce the traction of one magnet before closing the circuit to the other.

11. A variable speed transmission mechanism for automobiles embodying therein a driving shaft, a driven shaft, an electro-magnet carried by and rotatable with said driving shaft, a fixed magnet adjacent said driven shaft, two armatures adjacent said magnets respectively, a rim connecting the edges of said armatures whereby a gear chamber is formed therebetween, a gear within said chamber, carried by said driven shaft, a second gear within said chamber carried by said driving shaft, a plurality of gears rotatably mounted upon arbors carried by one of said armatures within said chamber said last named gears being constantly in mesh with said gears carried by said driven and said driving shaft, a casing inclosing said magnets and said armatures, and a variable resistance switch whereby either of said magnets may be energized and the traction thereof varied.

12. A variable speed transmission mechanism embodying therein a driving shaft, a driven shaft, a magnet carried by said driving shaft, a magnet adjacent said driven shaft, an armature intermediate said magnets, planetary gearing comprising gears carried by said driving and said driven shafts respectively and intermediate gears rotatably mounted upon said armature, and a variable resistance switch whereby either of said magnets may be engaged, and the traction of either magnet may be varied.

In witness whereof, I hereunto affix my signature in the presence of two subscribing witnesses, this 25th day of October, 1915.

WALTER K. THOMAS.

Witnesses:
F. T. WENTWORTH,
CLARICE FRANCK.

Copies of this patent may be obtained for five cents each, by addressing the "Commissioner of Patents, Washington, D. C."